(12) United States Patent
Kuno et al.

(10) Patent No.: US 11,305,524 B2
(45) Date of Patent: Apr. 19, 2022

(54) FOIL TRANSFER APPARATUS

(71) Applicant: DGSHAPE Corporation, Hamamatsu (JP)

(72) Inventors: Tsutomu Kuno, Hamamatsu (JP); Akari Sakuragi, Hamamatsu (JP)

(73) Assignee: DGSHAPE CORPORATION, Shizuoka (JP)

( * ) Notice: Subject to any disclaimer, the term of this patent is extended or adjusted under 35 U.S.C. 154(b) by 0 days.

(21) Appl. No.: 17/016,715

(22) Filed: Sep. 10, 2020

(65) Prior Publication Data
US 2021/0070035 A1 Mar. 11, 2021

(30) Foreign Application Priority Data
Sep. 11, 2019 (JP) .............................. JP2019-165684

(51) Int. Cl.
*B41F 19/06* (2006.01)
*B33Y 30/00* (2015.01)
*B33Y 10/00* (2015.01)

(52) U.S. Cl.
CPC ............. *B41F 19/062* (2013.01); *B33Y 10/00* (2014.12); *B33Y 30/00* (2014.12)

(58) Field of Classification Search
CPC ..... B33Y 10/00; B33Y 30/00; B41F 16/0026; B41F 19/062
See application file for complete search history.

(56) References Cited

U.S. PATENT DOCUMENTS

2018/0111409 A1* 4/2018 Takahashi ............. B44C 1/1729

FOREIGN PATENT DOCUMENTS

JP 2018-069501 A 5/2018

* cited by examiner

*Primary Examiner* — Vishal I Patel
(74) *Attorney, Agent, or Firm* — Keating & Bennett, LLP

(57) ABSTRACT

A foil transfer apparatus includes a support base on which a transfer object can be placed, a transfer tool including a pressing body to press the transfer object and a thermal transfer foil, to apply light to the thermal transfer foil, and to be movable in a transfer region having a rectangular or substantially rectangular shape in plan view, a pressing body moving mechanism to move the transfer tool relative to the support base, a detection jig detachably attachable to the support base, to overlap the transfer region in plan view when attached to the support base, and to be used to detect whether the pressing body is present or not, and a controller to control the transfer tool and the pressing body moving mechanism.

7 Claims, 13 Drawing Sheets

FOIL TRANSFER APPARATUS

CROSS REFERENCE TO RELATED APPLICATIONS

This application claims the benefit of priority to Japanese Patent Application No. 2019-165684 filed on Sep. 11, 2019. The entire contents of this application are hereby incorporated herein by reference.

BACKGROUND OF THE INVENTION

1. Field of the Invention

The present invention relates to a foil transfer apparatus.

2. Description of the Related Art

A decorative process by a heat transfer technique using thermal transfer foil (also called a heat transfer sheet) has been performed to date for purposes such as enhancement of aesthetic design. The thermal transfer foil is generally constituted by stacking a base material, a decorative layer, and an adhesive layer in this order. In performing transfer, thermal transfer foil is overlaid on a transfer object such that an adhesive layer of the foil contacts the transfer object, and the thermal transfer foil is heated by applying light with the thermal transfer foil being pressed from above with a transfer tool including a light source for applying light (e.g., laser light) and a pressing body for pressing the thermal transfer foil. Accordingly, the adhesive layer in a pressed portion of the thermal transfer foil is melted and attached to the surface of the transfer object, and then is cured by heat dissipation. Consequently, the base material of the thermal transfer foil is separated from the transfer object so that a decorative layer having a shape corresponding to the portion stamped with the foil can be attached to the transfer object together with the adhesive layer. In this manner, the surface of the transfer object is provided with a decoration having an intended shape (e.g., a figure or a character).

Japanese Patent Application Publication No. 2018-69501, for example, discloses a technique of transferring foil onto a transfer object using a transfer tool that applies laser light.

Before the foil transfer apparatus transfers thermal transfer foil, a process is performed to confirm that a pressing body is attached to the transfer tool. Conventionally, a transfer tool is brought into contact with a detection jig fixed at a predetermined position on a foil transfer apparatus to thereby detect whether a pressing body is present or not. However, for some transfer objects onto which thermal transfer foil is to be transferred, transfer of the thermal transfer foil is restricted around a place where a detection jig is placed depending on the way of placement. That is, since the detection jig and the transfer tool interfere with each other in a portion of the transfer object located below the detection jig, the portion cannot be pressed by the pressing body. For this reason, it is necessary to change the position of the transfer object or to change data for transfer (i.e., data of a foil image).

SUMMARY OF THE INVENTION

Preferred embodiments of the present invention provide foil transfer apparatuses each having high flexibility in placement of a transfer object.

A foil transfer apparatus according to a preferred embodiment of the present invention includes a support base to receive a transfer object placed thereon, a transfer tool including a case body and a pressing body to press the transfer object and a thermal transfer foil placed on the transfer object and to apply light to the thermal transfer foil, the transfer tool being movable in a transfer region having a rectangular or substantially rectangular shape in plan view, the pressing body projecting downward from a lower surface of the case body, a moving mechanism to move the transfer tool relative to the support base, a detection jig that is detachably attachable to the support base to overlap with the transfer region in plan view when the detection jig is attached to the support base, the detection jig being usable to detect whether the pressing body is present or not, and a controller to control the transfer tool and the moving mechanism. The controller includes a memory to store a reference length that is a length in a top-bottom direction from a lower end of the pressing body to a lower surface of the case body, a first detector to detect a first height position of the transfer tool in the top-bottom direction when the transfer tool is lowered and partially brought into contact with the detection jig at a first position at which the pressing body overlaps with the detection jig in plan view, a second detector to detect a second position of the transfer tool in the top-bottom direction when the transfer tool is lowered and partially brought into contact with the detection jig at a second position at which the pressing body does not overlap with the detection jig in plan view and at least a portion of the case body overlaps with the detection jig in plan view, and a determiner to determine whether the pressing body is present or not based on the reference length, the first height position, and the second height position.

In a foil transfer apparatus according to a preferred embodiment of the present invention, the detection jig used to detect whether the pressing body is present or not overlaps with the transfer region in plan view when the detection jig is attached to the support base. Thus, the thermal transfer foil cannot be transferred onto a portion of the transfer object located below the detection jig. However, since the detection jig is detachably attachable to the support base, the detection jig can be attached to any portion of the support base in accordance with the shape of the transfer object or data of a foil image. Accordingly, for example, the detection jig can be disposed above a portion of the transfer object onto which the thermal transfer foil is not transferred. As described above, since the position of the detection jig can be changed, flexibility in placement of the transfer object is improved.

According to preferred embodiments of the present invention, it is possible to provide foil transfer apparatuses each having high flexibility in placement of a transfer object.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
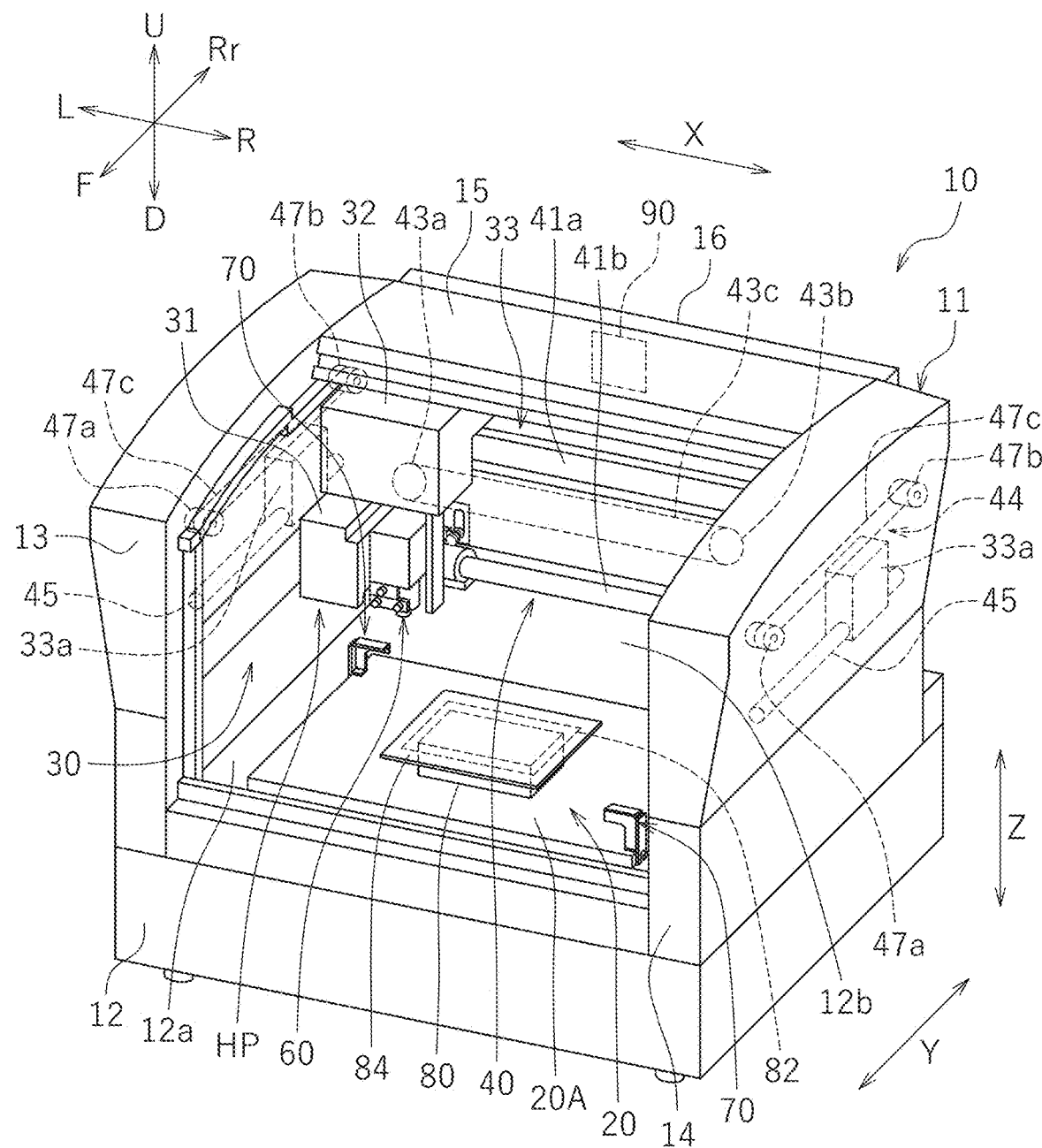
FIG. 1 is a perspective view illustrating a foil transfer apparatus according to a preferred embodiment of the present invention.

Preferred embodiments of the present invention will be described hereinafter with reference to the drawings. The preferred embodiments described here are, of course, not intended to particularly limit the present invention. Elements and features having the same functions are denoted by the same reference numerals, and description for the same elements and features will not be repeated or will be simplified as appropriate.

First Preferred Embodiment

FIG. 1 is a perspective view illustrating a foil transfer apparatus 10 according to a first preferred embodiment of the present invention. In the following description, left, right, up, and down refer to left, right, up, and down, respectively, when a user in front of the foil transfer apparatus 10 sees the foil transfer apparatus 10. When seen from the user, a direction toward the foil transfer apparatus 10 will be referred to as rearward, and a direction away from the foil transfer apparatus 10 will be referred to as forward. Characters F, Rr, L, R, U, and D in the drawings represent front, rear, left, right, up, and down, respectively. Supposing axes orthogonal to one another are an X axis, a Y axis, and a Z axis, the foil transfer apparatus 10 according to this preferred embodiment is placed on a plane constituted by the X axis and the Y axis. Here, the X axis extends leftward and rightward. The Y axis extends forward and rearward. A plane constituted by the X axis and the Y axis is a horizontal plane in this preferred embodiment. The Z axis extends upward and downward (in top-bottom directions). It should be noted that these directions are defined simply for convenience of description, and do not limit the state of installation of the foil transfer apparatus 10.

As illustrated in FIG. 1, the foil transfer apparatus 10 applies (which will be referred to as transfers) a decorative layer in a sheet-shaped thermal transfer foil 82 onto a surface of a transfer object 80 by pressing and heating the thermal transfer foil 82 and a light absorption film 84 with a transfer tool 60 described later with the thermal transfer foil 82 and the light absorption film 84 being overlaid on the transfer object 80. The thermal transfer foil 82 is indirectly pressed against the transfer tool 60 with the light absorption film 84 interposed therebetween. The light absorption film 84 is unnecessary in some cases depending on the materials, shapes, and configurations of the transfer object 80 and the thermal transfer foil 82. The light absorption film 84 is unnecessary for some types of a laser oscillator mounted on the foil transfer apparatus 10. For example, the light absorption film 84 does not need to be used in a case where the laser oscillator is capable of outputting laser light having a heat quantity necessary to transfer the thermal transfer foil 82 onto the transfer object 80.

The material of the transfer object 80 and the shape of the transfer object 80 are not specifically limited. Examples of the material for the transfer object 80 include: metal such as gold, silver, copper, platinum, brass, aluminum, iron, titanium, and stainless; resin materials such as acrylic, polyvinyl chloride (PVC), polyethylene terephthalate (PET), and polycarbonate (PC); papers such as plain paper, drawing paper, and Japanese paper; and rubbers. Examples of the material for the transfer object 80 also include genuine leather (i.e., natural leather) and artificial leather (e.g., synthetic leather or faux leather) at least partially including the resin material described above and/or other materials.

The thermal transfer foil 82 may be, but is not limited to, transfer foil commercially available for heat transfer, for example. The thermal transfer foil 82 is typically a stack of a base material, a decorative layer, and an adhesive layer in this order. The thermal transfer foil 82 includes, for example, metallic foil such as gold foil and sliver foil, half metallic foil, pigment foil, multi-color printing foil, hologram foil, and electrostatic destruction measures foil. The thermal transfer foil 82 has a band shape or a sheet shape. The thermal transfer foil 82 is placed on the transfer object 80. The thermal transfer foil 82 is placed on the transfer object 80 such that the adhesive layer of the thermal transfer foil 82 contacts the transfer object 80. The thermal transfer foil 82 may further include a light absorption layer between the base material and the decorative layer. In a case where the thermal transfer foil 82 includes a light absorption layer, the base material is made of a transparent material. The light absorption layer has a configuration similar to that of the light absorption film 84 described later. In the case where the thermal transfer foil 82 includes the light absorption layer, the foil transfer apparatus 10 does not need to include the light absorption film 84 in some cases. Even in the case where the thermal transfer foil 82 includes the light absorption layer, the foil transfer apparatus 10 preferably includes the light absorption film 84.

Some configurations of the thermal transfer foil 82 to be used can have no or poor light absorption property to light applied from a laser oscillator 62 (see FIG. 3) of the transfer tool 60 described later. In such cases, the light absorption film 84 is placed on top of the thermal transfer foil 82. The light absorption film 84 refers to a sheet configured to efficiently absorb laser light in a predetermined wavelength range applied from the laser oscillator 62 of the transfer tool 60 and to convert optical energy to thermal energy. The light absorption film 84 has a heat resistance at about 100° C. to about 200° C. The light absorption film 84 is made of a resin such as polyimide. The light absorption film 84 is monochrome. From the viewpoint of efficiently converting optical energy to thermal energy, the hue of the light absorption film 84 is preferably complementary to the color of laser light applied from the light source 62. For example, in a case where laser light applied from the laser oscillator 62 is blue, the light absorption film 84 is preferably yellow. The light absorption film 84 may be provided with a support film to increase strength as necessary. The support film has a light absorption property significantly lower than that of the light absorption film 84. The support film has a light transmittance higher than that of the light absorption film 84. The support film is made of a material transparent to laser light emitted from the laser oscillator 62. The support film is, for example, transparent. The support film is a plastic film such as polyester.

As illustrated in FIG. 1, the thermal transfer apparatus 10 has a box shape. The foil transfer apparatus 10 includes a housing 11 that is open at the front and at the top, a pressing body moving mechanism 30 disposed in the housing 11, the transfer tool 60, and a support base 20 configured such that a transfer object 80 can be placed on the support base 20. The opening of the housing 11 is provided with an unillustrated cover that can be opened and closed. The housing 11 includes a bottom wall portion 12, a left side wall portion 13, a right side wall portion 14, an upper wall portion 15, and a rear wall portion 16.

As illustrated in FIG. 1, the bottom wall portion 12 is provided with the support base 20. The length of the bottom wall portion 12 along the X axis is smaller than the length of the bottom wall portion 12 along the Y axis. A region ahead of the bottom wall portion 12 is a first region 12$a$ where the support base 20 is disposed. A region behind the bottom wall portion 12 is a second region 12$b$ on which the transfer object 80 placed on the support base 20 can be placed across the support base 20.

As illustrated in FIG. 1, the left side wall portion 13 extends upward at the left end of the bottom wall portion 12. The left side wall portion 13 is perpendicular to the bottom wall portion 12. The right side wall portion 14 extends upward at the right end of the bottom wall portion 12. The right side wall portion 14 is perpendicular to the bottom wall portion 12. The rear wall portion 16 extends upward at the rear end of the bottom wall portion 12. The rear wall portion 16 is connected to the rear end of the left side wall portion 13 and the rear end of the right side wall portion 14. The rear wall portion 16 houses a controller 90 described later. The upper wall portion 15 is connected to the upper end of a rear portion of the left side wall portion 13, the upper end of a rear portion of the right side wall portion 14, and the upper end of the rear wall portion 16. A region surrounded by the bottom wall portion 12, the left side wall portion 13, the right side wall portion 14, the upper wall portion 15, and the rear wall portion 16 is an internal space of the housing 11.

As illustrated in FIG. 1, the internal space of the housing 11 is a space where the thermal transfer foil 82 is transferred onto the transfer object 80. The pressing body moving mechanism 30 is provided in the internal space. That is, the pressing body moving mechanism 30 is housed in the housing 11. The pressing body moving mechanism 30 is an example of a moving mechanism. The pressing body moving mechanism 30 includes a first carriage 31 that holds the transfer tool 60, a second carriage 32 that holds the first carriage 31, a third carriage 33 that holds the second carriage 32, a Z-axis direction moving mechanism 36 (see FIG. 2) that moves the a first carriage 31 along the Z axis, an X-axis direction moving mechanism 40 that moves the first carriage 31 and the second carriage 32 along the X axis, and a Y-axis direction moving mechanism 44 that moves the first carriage 31, the second carriage 32, and the third carriage 33 along the Y axis. The pressing body moving mechanism 30 moves the transfer tool 60 in three dimensions. The transfer tool 60 is movable relative to the support base 20 (i.e., the transfer object 80) by the Z-axis direction moving mechanism 36, the X-axis direction moving mechanism 40, and the Y-axis direction moving mechanism 44. That is, the pressing body moving mechanism 30 moves a pressing body 66 of the transfer tool 60 relative to the support base 20. The Z-axis direction moving mechanism 36, the X-axis direction moving mechanism 40, and the Y-axis direction moving mechanism 44 are disposed above the bottom wall portion 12. The transfer tool 60 is disposed on a lower portion of the first carriage 31.

Figure 2:
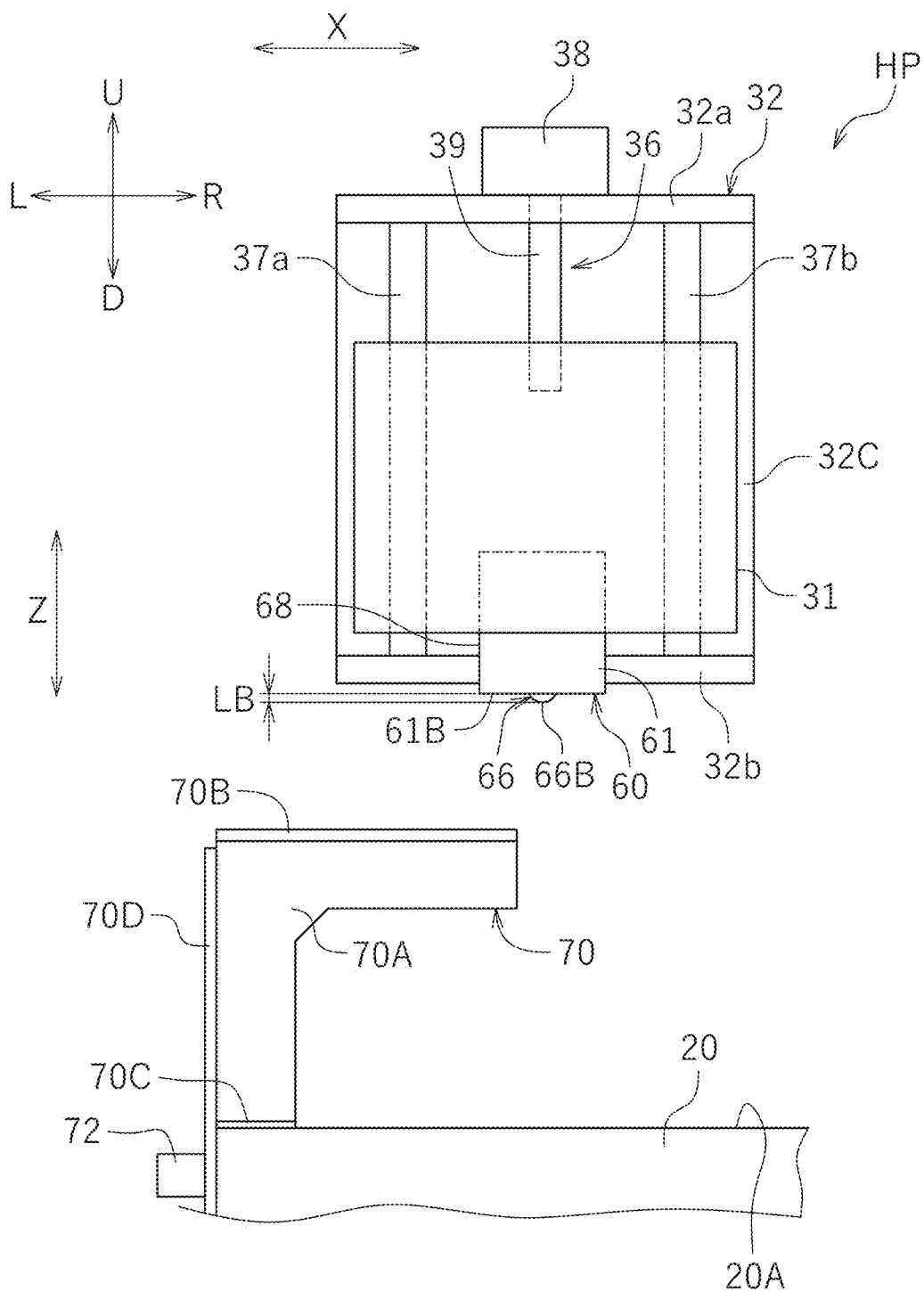
FIG. 2 is a front view schematically illustrating a configuration of the vicinity of a transfer tool according to a preferred embodiment of the present invention.

As illustrated in FIG. 2, the Z-axis direction moving mechanism 36 is disposed on the second carriage 32. The Z-axis direction moving mechanism 36 moves the pressing body 66 of the transfer tool 60 along the Z axis. The second carriage 32 includes a first portion 32$a$ extending along the Y axis and the X axis, a second portion 32$b$ located below the first portion 32$a$ and extending along the Y axis and the X axis, and a third portion 32$c$ connecting the rear end of the first portion 32$a$ and the rear end of the second portion 32$b$ and extending along the Z axis. The Z-axis direction moving mechanism 36 includes a first Z-axis shaft 37$a$, a second Z-axis shaft 37$b$, a trapezoidal screw 39, and a first motor 38. The first Z-axis shaft 37$a$, the second Z-axis shaft 37$b$, and the trapezoidal screw 39 extend along the Z axis. The first Z-axis shaft 37$a$ and the second Z-axis shaft 37$b$ are supported by the first portion 32$a$ and the second portion 32$b$ of the second carriage 32. The trapezoidal screw 39 penetrates the first portion 32$a$ of the second carriage 32. The upper end of the trapezoidal screw 39 is coupled to the first motor 38. The lower end of the trapezoidal screw 39 is connected to the first carriage 31. The first motor 38 causes the trapezoidal screw 39 to rotate. The first motor 38 is disposed on the first portion 32$a$ of the second carriage 32. The first motor 38 is an electric motor. The first motor 38 is controlled by the controller 90 (see also FIG. 9). The first carriage 31 is disposed on the first Z-axis shaft 37$a$ and the second Z-axis shaft 37$b$ to be slidable along the Z axis. When the first motor 38 is driven, rotation of the trapezoidal screw 39 causes the first carriage 31 to move along the Z axis along the first Z-axis shaft 37$a$ and the second Z-axis shaft 37$b$.

As illustrated in FIG. 1, the X-axis direction moving mechanism 40 is disposed on the third carriage 33. The X-axis direction moving mechanism 40 moves the pressing body 66 of the transfer tool 60 along the X axis. The third carriage 33 has a box shape. The third carriage 33 is disposed below the upper wall portion 15 and above the bottom wall portion 12. The third carriage 33 extends from the left side wall portion 13 to the right side wall portion 14. The X-axis direction moving mechanism 40 includes a first X-axis shaft 41a, a second X-axis shaft 41b, a left pulley 43a, a right pulley 43b, a wire 43c wound around a left pulley 43a and a right pulley 43b, and a second motor 42 (see FIG. 9) connected to the left pulley 43a. The first X-axis shaft 41a and the second X-axis shaft 41b extend along the X axis. The first X-axis shaft 41a and the second X-axis shaft 41b are supported by the third carriage 33. The left pulley 43a, the right pulley 43b, and the wire 43c are disposed on the third carriage 33. The wire 43c is disposed below the first X-axis shaft 41a and above the second X-axis shaft 41b. The wire 43c is disposed behind the first X-axis shaft 41a and the second X-axis shaft 41b. A part of the wire 43c is connected to the second carriage 32. The second motor 42 causes the left pulley 43a to rotate. The second motor 42 is disposed on the third carriage 33. The second motor 42 is an electric motor. The second motor 42 is controlled by the controller 90 (see also FIG. 9). The second carriage 32 is disposed on the first X-axis shaft 41a and the second X-axis shaft 41b to be slidable along the X axis. When the second motor 42 is driven, running of the wire 43c causes the second carriage 32 to move along the X axis along the first X-axis shaft 41a and the second X-axis shaft 41b.

As illustrated in FIG. 1, the Y-axis direction moving mechanism 44 is disposed in the housing 11. The Y-axis direction moving mechanism 44 moves the pressing body 66 of the transfer tool 60 along the Y axis. The Y-axis direction moving mechanism 44 includes, on each of the left side wall portion 13 and the right side wall portion 14, a Y-axis shaft 45, a front pulley 47a, a rear pulley 47b, and a wire 47c wound around the a front pulley 47a and the rear pulley 47b. The Y-axis direction moving mechanism 44 includes a third motor 46 (see FIG. 9) connected to the rear pulley 47b disposed on the right side wall portion 14. The third motor 46 is disposed on the right side wall portion 14. The Y-axis shaft 45 extends along the Y axis. The Y-axis shaft 45 is supported by the left side wall portion 13 and the right side wall portion 14. The front pulley 47a, the rear pulley 47b, and the wire 47c are disposed on each of the left side wall portion 13 and the right side wall portion 14. The wire 47c is disposed above the Y-axis shaft 45. The third motor 46 causes the rear pulley 47b disposed on the right side wall portion 14 to rotate. The third motor 46 is an electric motor. The third motor 46 is controlled by the controller 90 (see also FIG. 9). The sliding member 33a connected to the third carriage 33 is disposed on the Y-axis shaft 45 to be slidable along the Y axis. The sliding member 33a moves together with the third carriage 33. A portion of the wire 47c is connected to the sliding member 33a. When the third motor 46 is driven, running of the wire 47c causes the third carriage 33 to move along the Y axis along the Y-axis shaft 45.

Figure 3:
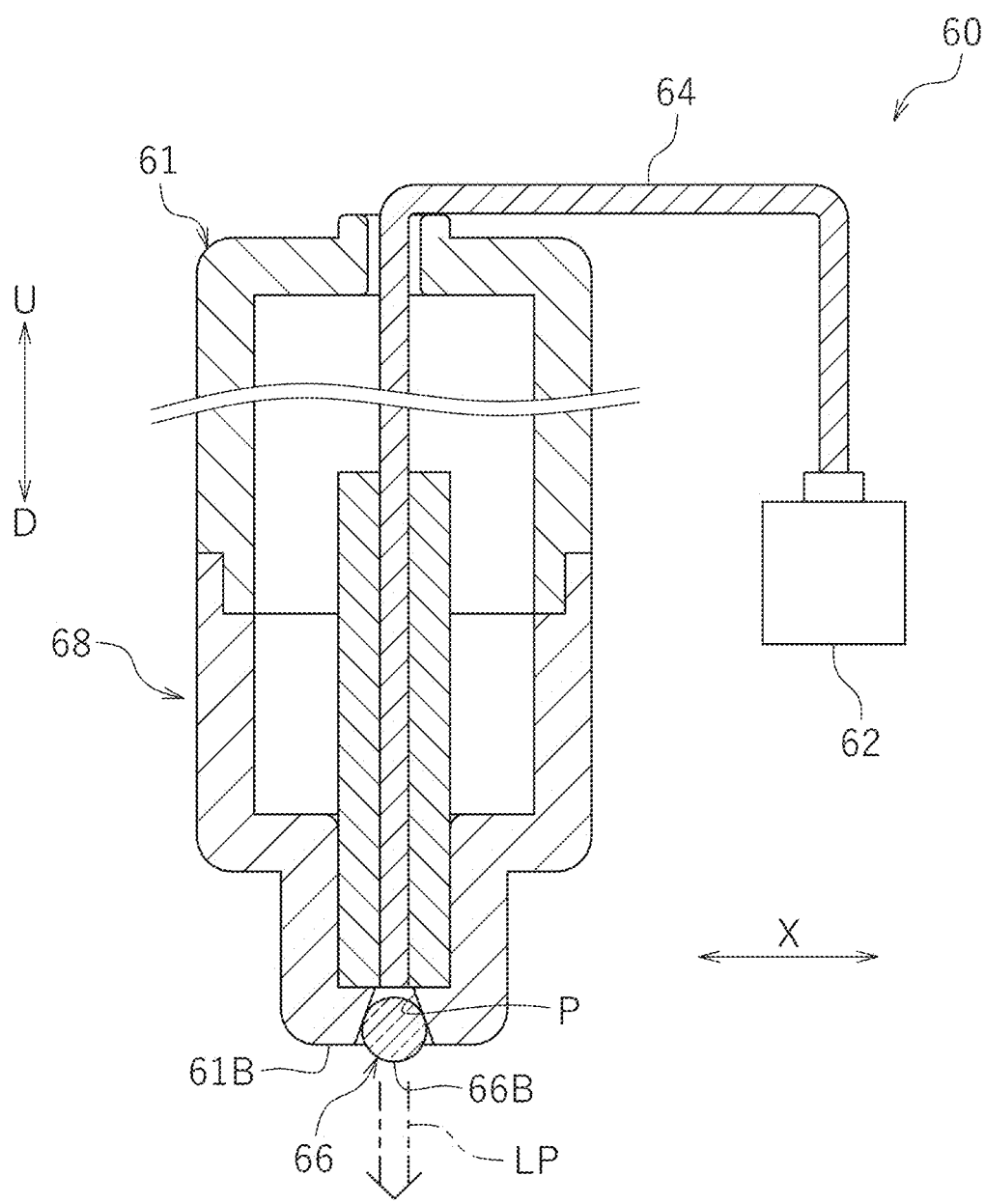
FIG. 3 is a cross-sectional view schematically illustrating a transfer tool according to a preferred embodiment of the present invention.

As illustrated in FIG. 3, the transfer tool 60 is an apparatus configured to press the thermal transfer foil 82 placed on the transfer object 80 and apply light (e.g., laser light) toward the thermal transfer foil 82. In the case of using the light absorption film 84, the light absorption film 84 is pressed by the transfer tool 60. The transfer tool 60 is an apparatus that applies light to the thermal transfer foil 82 placed on the transfer object 80 and the light absorption film 84 and supply heat to the thermal transfer foil 82. The transfer tool 60 is disposed above the support base 20. The transfer tool 60 includes a laser oscillator 62, a case body 61, and a pressing body 66 detachably held at the lower end of the case body 61. The transfer tool 60 is configured to be movable in a transfer region TA (see FIG. 4). The laser oscillator 62 is an example of a light source.

As illustrated in FIG. 2, the case body 61 is held by the first carriage 31. As illustrated in FIG. 3, the case body 61 preferably has an elongated cylindrical shape. The case body 61 houses a portion of optical fibers 64 connected to the laser oscillator 62. The case body 61 includes a holder 68 that holds the pressing body 66. The holder 68 has a through hole P penetrating the holder 68 in the top-bottom directions. The pressing body 66 is held to overlap with the through hole P. End portions of the optical fibers 64 overlap with the through hole P. Accordingly, the holder 68 does not interfere with a light path LP of laser light.

As illustrated in FIG. 3, the pressing body 66 projects downward from the lower surface 61B (i.e., corresponding to the lower surface of the holder 68) of the case body 61. The pressing body 66 presses the transfer object 80 and the thermal transfer foil 82 placed on the transfer object 80. In the case of using the light absorption film 84, the pressing body 66 presses the light absorption film 84. The pressing body 66 applies light to the thermal transfer foil 82. In a case where the light absorption film 84 is placed on the thermal transfer foil 82, the pressing body 66 applies light to the light absorption film 84. This operation means that light is applied to the thermal transfer foil 82 in a case where the thermal transfer foil 82 is located at a destination of light through the light absorption film 84. As will be described later, laser light generated by the laser oscillator 62 is applied to the outside through the pressing body 66. The pressing body 66 may be made of, for example, glass. The pressing body 66 in this preferred embodiment is made of synthetic quartz glass. The pressing body 66 defines and functions as a lens.

The laser oscillator 62 generates laser light. Laser light generated by the laser oscillator 62 reaches the pressing body 66 through the optical fibers 64. Laser light that has reached the pressing body 66 is applied to the outside of the case body 61 through the pressing body 66. The laser oscillator 62 in this preferred embodiment includes a laser diode (semiconductor laser) to apply laser light and an optical system, for example. The laser oscillator 62 is controlled by the controller 90. The laser oscillator 62 is disposed in the housing 11.

Figure 4:
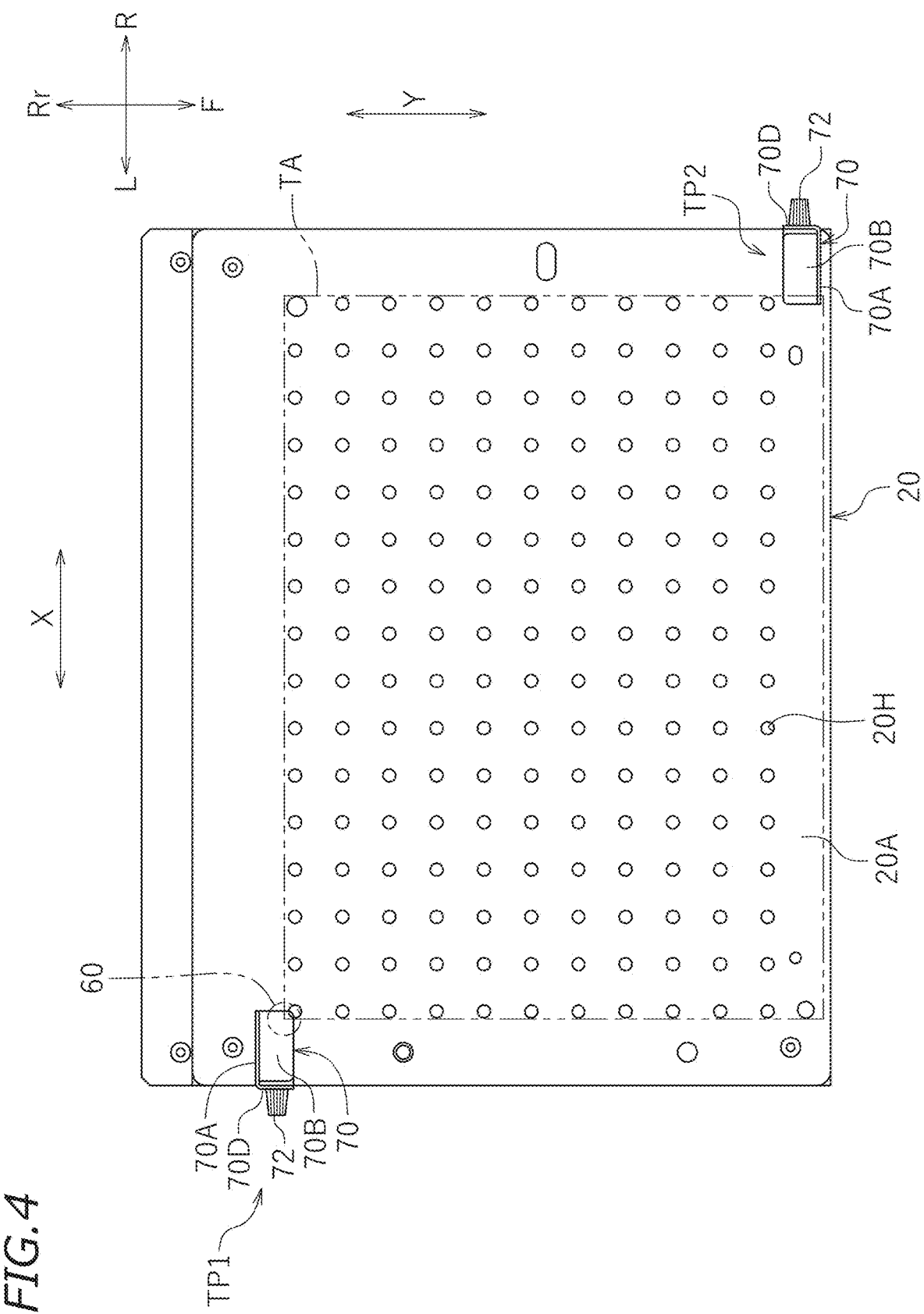
FIG. 4 is a plan view illustrating a state where a detection jig is attached to a support base according to a preferred embodiment of the present invention.

As illustrated in FIG. 1, the transfer object 80 is placed on the support base 20. A surface 20A of the support base 20 is located above the bottom wall portion 12. As illustrated in FIG. 4, the support base 20 has a rectangular or substantially rectangular shape whose length along the X axis is larger than the length along the Y axis. The support base 20 may be configured such that the length along the X axis is larger than the length along the Y axis or the length along the X axis is equal to the length along the Y axis. The transfer region TA is provided on the support base 20. The transfer region TA has a rectangular or substantially rectangular shape in plan view. The transfer region TA is formed such that the length along the X axis larger than the length along the Y axis. The transfer region TA may be configured such that the length along the X axis is larger than the length along the Y axis or the length along the X axis is equal to the length along the Y axis. The transfer region TA is a region where the pressing body 66 of the transfer tool 60 is movable. That is, the transfer region TA is a region where the thermal transfer foil 82 can be transferred onto the transfer object 80. A plurality of through holes 20H are formed in the surface 20A of the support base 20. Unillustrated positioning pins are inserted in the through holes 20H. The transfer object 80 is brought into contact with the positioning pins so that positioning of the transfer object 80 is facilitated.

Figure 5:
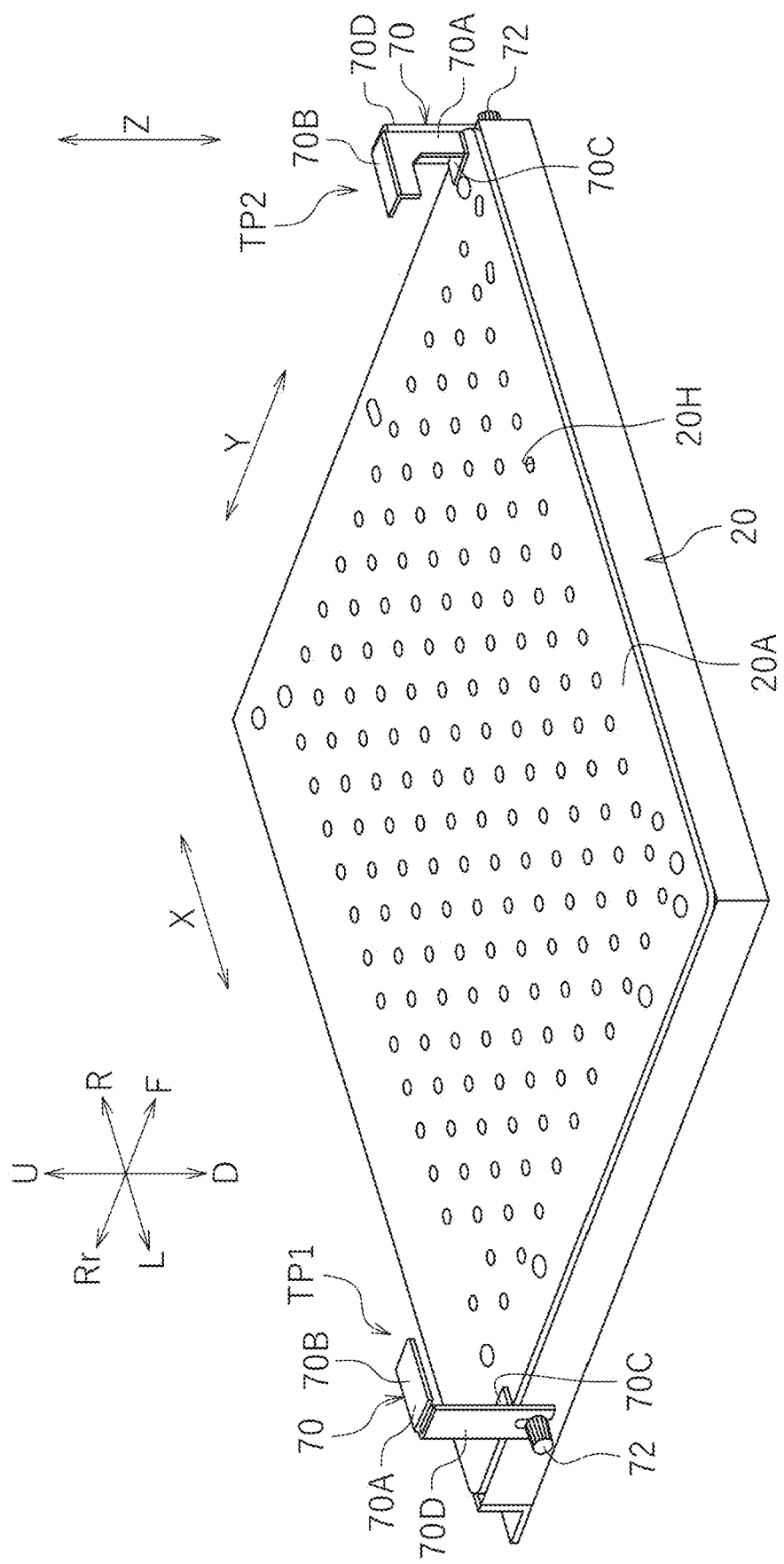
FIG. 5 is a perspective view illustrating a state where a detection jig is attached to a support base according to a preferred embodiment of the present invention.
Figure 6A:
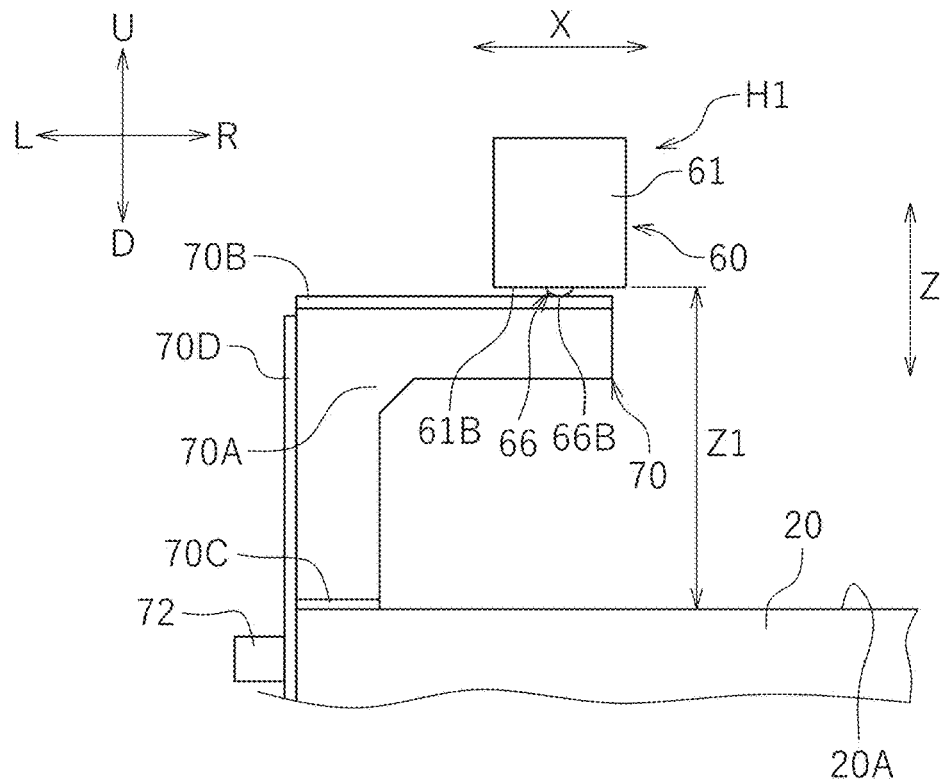
FIG. 6A is a front view schematically illustrating a state where a pressing body of a transfer tool and a detection jig are in contact with each other at a first position.

As illustrated in FIG. 5, the foil transfer apparatus 10 includes detection jigs 70 for use in detecting whether the pressing body 66 of the transfer tool 60 is present or not. The detection jigs 70 are detachably attachable to the support base 20. In the examples illustrated in FIGS. 4 and 5, the detection jigs 70 are detachably disposed at a first detection position TP1 that is a left back corner of the four corners of the transfer region TA and a second detection position TP2 that is a right front corner of the transfer region TA. The first detection position TP1 is a region that overlaps with the transfer tool 60 in plan view when the transfer tool 60 is located at a standby position HP (see FIG. 1). In this preferred embodiment, the standby position HP is a position at which the transfer tool 60 is kept on standby at a stamping standby time, that is, while the thermal transfer foil 82 is not transferred onto the transfer object 80. In this preferred embodiment, the standby position HP is located at the left ends of the first X-axis shaft 41a and the second X-axis shaft 41b and the rear end of the Y-axis shaft 45. The second detection position TP2 is located at the corner diagonally opposite to the first detection position TP1. As illustrated in FIG. 4, the detection jigs 70 overlap with the transfer region TA in plan view when the detection jigs 70 are attached to the support base 20. As illustrated in FIG. 6A, each of the detection jigs 70 has a substantially L shape in front view. The detection jig 70 includes an L-shaped body 70A, a contact portion 70B extending forward from the upper end of the body 70A and configured to contact the transfer tool 60, a support portion 70C extending forward from the lower end of the body 70A and configured to contact the surface 20A of the support base 20, and a fixture portion 70D extending forward and downward from the left end of the body 70A and configured to be fixed to the support base 20 through a screw 72. The contact portion 70B of the detection jig 70 overlaps with the transfer region TA in plan view.

In the examples illustrated in FIGS. 4 and 5, the detection jigs 70 are attached to the first detection position TP1 and the second detection position TP2, but the position of attachment of the detection jigs 70 is not limited to this example. For example, the detection jigs 70 may be attached to the right back corner and the left front corner of the four corners of the transfer region TA. The detection jigs 70 may be attached to sides of the transfer region TA except for the four corners. It is sufficient to attach at least one detection jig 70 to the support base 20. That is, in the example illustrated in FIG. 4, it is sufficient to attach the detection jig 70 to the first detection position TP1 or the second detection position TP2 depending on, for example, the shape of the transfer object 80. In addition, the length of the detection jig 70 in the top-bottom directions (i.e., the height of the contact portion 70B from the support base 20) may be changed depending on the position to which the detection jig 70 is attached.

Figure 9:
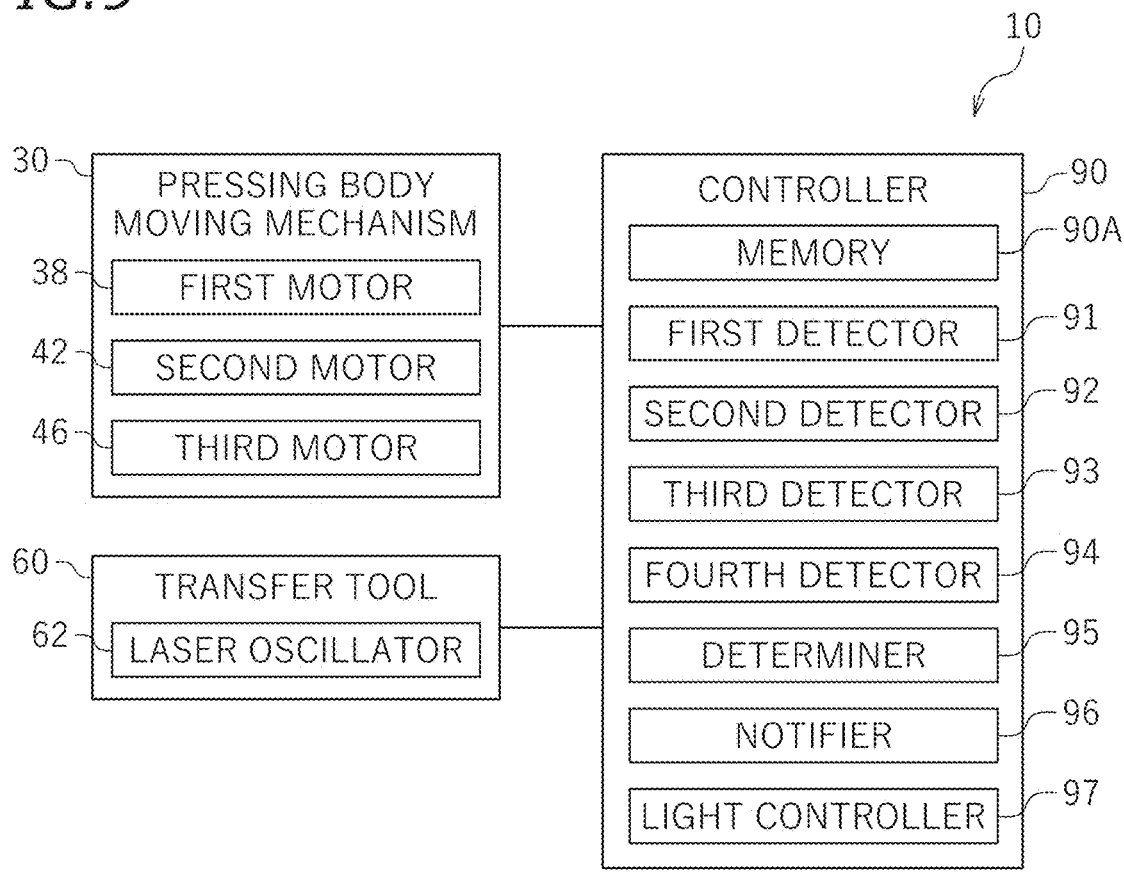
FIG. 9 is a block diagram of a foil transfer apparatus according to a preferred embodiment of the present invention.

An overall operation of the foil transfer apparatus 10 is controlled by the controller 90. As illustrated in FIG. 9, the controller 90 is communicably connected to the pressing body moving mechanism 30 and the laser oscillator 62 of the transfer tool 60, and is configured to enable control of the pressing body moving mechanism 30 and the laser oscillator 62. The controller 90 is communicably connected to the first motor 38, the second motor 42, and the third motor 46, and is configured to enable control of these motors. The controller 90 is typically a computer. The controller 90 includes, for example, an interface (I/F) that receives printing data and other data from external equipment such as a host computer, a central processing unit (CPU) that executes instructions of a control program, a ROM that stores programs to be executed by the CPU, a RAM to be used as a working area where a program is developed, and a memory such as a memory to store the programs and various types of data.

As illustrated in FIG. 9, the controller 90 includes, for example, a memory 90A, a first detector 91, a second detector 92, a third detector 93, a fourth detector 94, a determiner 95, a notifier 96, and a light controller 97. The functions of these elements of the controller 90 are implemented by programs. These programs are read from a recording medium such as a CD or a DVD. These programs may be downloaded through the Internet. The functions of the elements of the controller 90 may be implemented by, for example, processor(s) and/or circuit(s). Specific functions of these elements will be described later.

The memory 90A stores a reference length LB (see FIG. 2) that is a length in the top-bottom directions from a lower end 66B of the pressing body 66 of the transfer tool 60 to the lower surface 61B of the case body 61. The memory 90A stores foil image data. The foil image data can be created as intended by a user with software installed in an external computer. The memory 90A stores a portion of the support base 20 to which the detection jig 70 is attached.

Figure 6B:
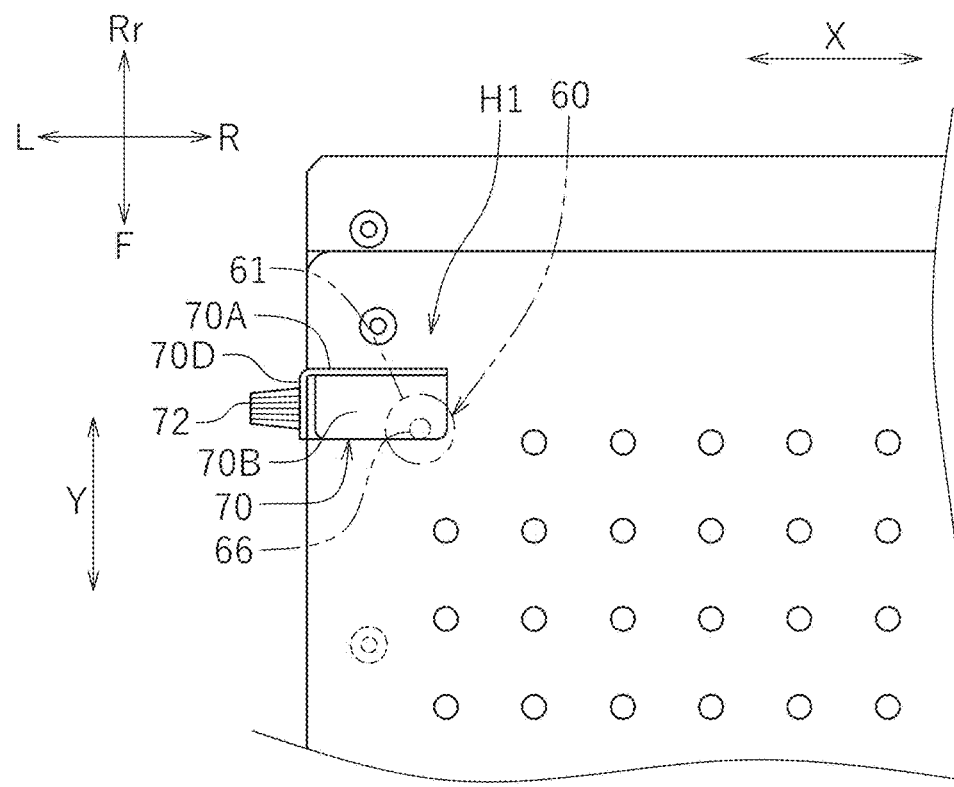
FIG. 6B is a plan view illustrating the first position.

The first detector 91 detects a first height position of the transfer tool 60 in the top-bottom directions when the transfer tool 60 is lowered and partially brought into contact with the detection jigs 70 at a first position H1 (see FIG. 6B) at which the pressing body 66 overlaps with the detection jigs 70 in plan view. As illustrated in FIG. 6A, in a case where the pressing body 66 is attached to the transfer tool 60, when the transfer tool 60 is lowered, the pressing body 66 (more specifically the lower end 66B) and the detection jigs 70 (more specifically the contact portion 70B) are brought into contact with each other. The first height position at this time is, for example, calculated as a length Z1 in the top-bottom directions from the surface 20A of the support base 20 to the lower surface 61B of the case body 61. The first detector 91 controls the first motor 38, the second motor 42, and the third motor 46.

Figure 7A:
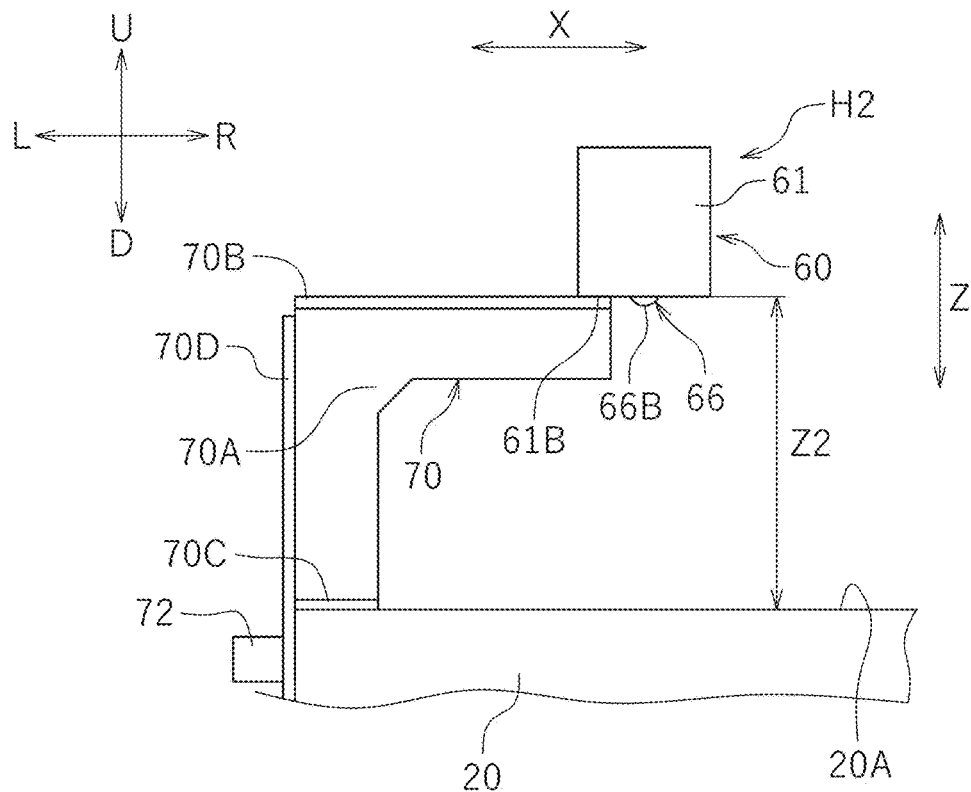
FIG. 7A is a front view schematically illustrating a state where a case body of the transfer tool and the detection jig are in contact with each other at a second position.
Figure 7B:
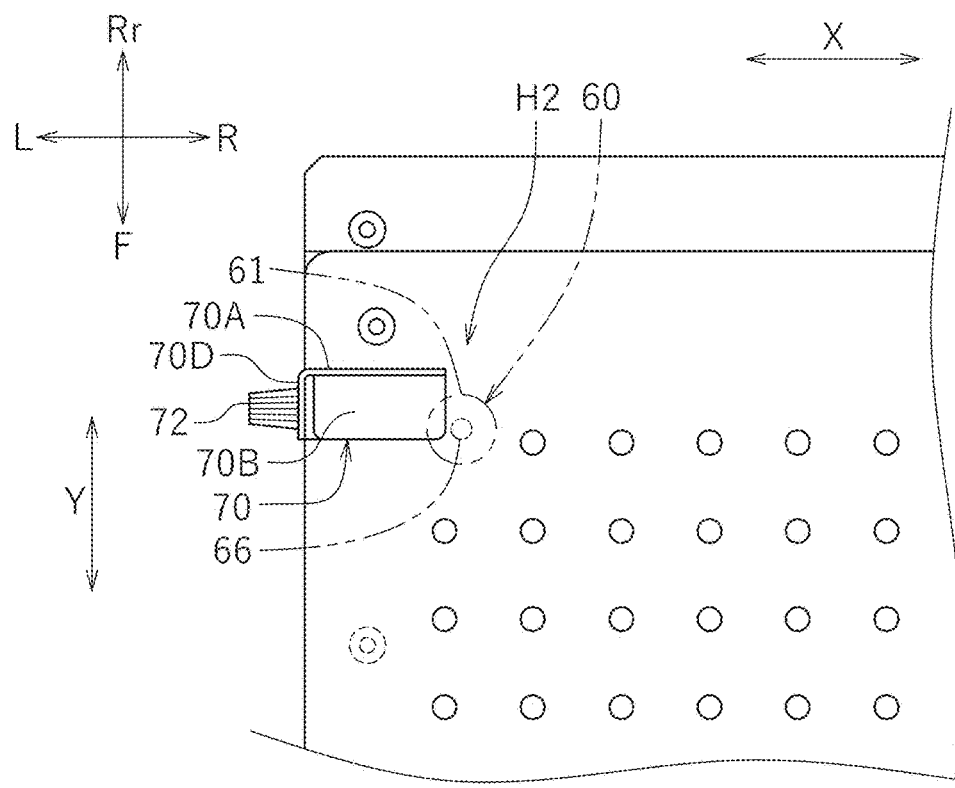
FIG. 7B is a plan view illustrating the second position.

The second detector 92 detects a second height position of the transfer tool 60 in the top-bottom directions when the transfer tool 60 is lowered and partially brought into contact with the detection jigs 70 at a second position H2 (see FIG. 7B) at which the pressing body 66 does not overlap with the detection jigs 70 in plan view and at least a portion of the case body 61 overlaps with the detection jigs 70. As illustrated in FIG. 7A, in a case where the pressing body 66 is attached to the transfer tool 60, when the transfer tool 60 is lowered, the case body 61 (more specifically the lower surface 61B) and the detection jigs (more specifically the contact portion 70B) are brought into contact with each other. The second height position at this time is, for example, calculated as a length Z2 in the top-bottom directions from the surface 20A of the support base 20 to the lower surface 61B of the case body 61. The second detector 92 controls the first motor 38, the second motor 42, and the third motor 46.

Figure 8:
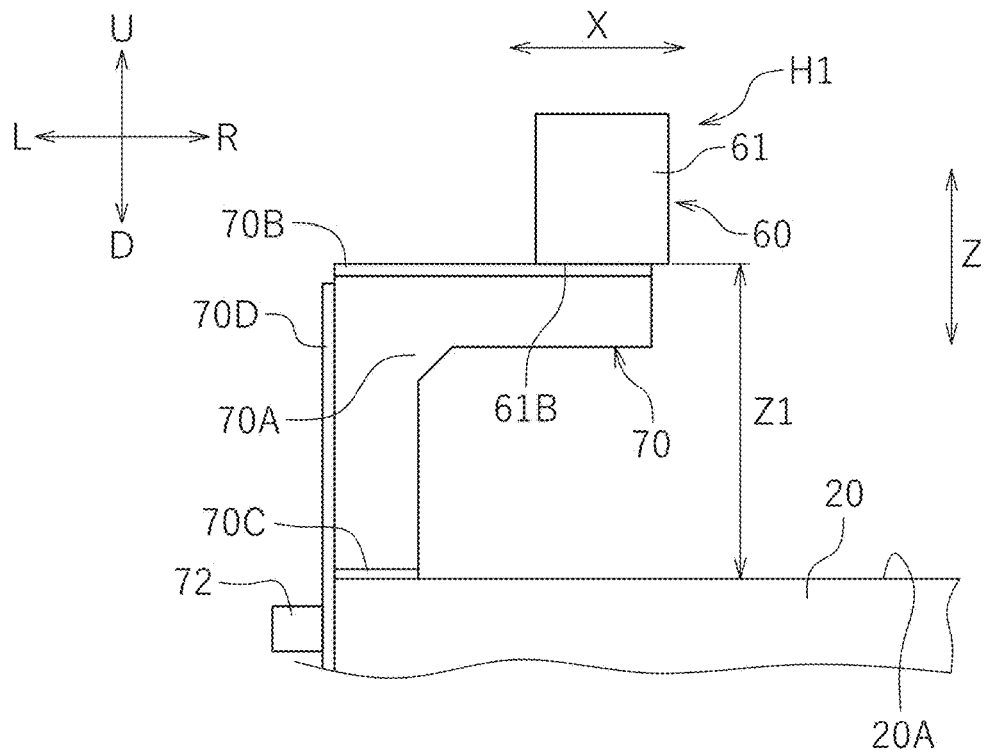
FIG. 8 is a front view schematically illustrating a state where the case body of the transfer tool and the detection jig are in contact with each other at the first position.

The determiner 95 determines whether the pressing body 66 is present or not based on the reference length LB (see FIG. 2) stored in the memory 90A, the first height position detected by the first detector 91, and the second height position detected by the second detector 92. That is, the determiner 95 determines whether the absolute value of a difference between the first height position and the second height position (e.g., $|Z1-Z2|$) is equal to the reference length LB or not. If the absolute value of the difference between the first height position and the second height position is equal to the reference length LB, the determiner 95 determines that the pressing body 66 is present. On the other hand, if the absolute value of the difference between the first height position and the second height position is not equal to the reference length LB, the determiner 95 determines that the pressing body 66 is not present. For example, as illustrated in FIG. 8, in a case where the pressing body 66 is not attached to the transfer tool 60, when the transfer tool 60 is lowered at the first position H1, the case body 61 (more specifically the lower surface 61B) and the detection jigs 70 (more specifically contact portion 70B) are brought into contact with each other. That is, the first height position at this time is equal to the second height position, and the absolute value of the difference between the first height position and the second height position is not equal to the reference length LB.

If the determiner 95 determines that the pressing body 66 is not present, the notifier 96 notifies that the pressing body 66 is not attached to the case body 61. The way of notification is not specifically limited, and examples of the notification include visual display and notification by sound or the like. In this preferred embodiment, the notifier 96 visually notifies a user through an unillustrated LED light disposed outside the housing 11, for example.

The light controller 97 controls application of laser light from the laser oscillator 62. The light controller 97 applies laser light from the laser oscillator 62 if the determiner 95 determines that the pressing body 66 is present. The light controller 97 is configured not to apply laser light from the laser oscillator 62 if the determiner 95 determines that the pressing body 66 is not present.

As described above, in the foil transfer apparatus 10 of this preferred embodiment, the detection jigs 70 used to detect whether the pressing body 66 is present or not overlaps with the transfer region TA in plan view when the detection jigs 70 are attached to the support base 20. Thus, the thermal transfer foil 82 cannot be transferred onto a portion of the transfer object 80 located below the detection jig 70. However, since the detection jigs 70 are detachably attachable to the support base 20, the detection jigs 70 can be attached to any portion of the support base 20 depending on the shape of the transfer object 80 and/or data of a foil image. Accordingly, for example, the detection jigs 70 can be disposed above a portion of the transfer object 80 onto which the thermal transfer foil 82 is not transferred. As described above, since the position of the detection jigs 70 can be changed, flexibility in placing the transfer object 80 is improved.

In the foil transfer apparatus 10 of this preferred embodiment, the detection jigs 70 are detachably attachable to the first detection position TP1 that is one of the four corners of the transfer region TA and overlaps with the transfer tool 60 in plan view while the transfer tool 60 is located at the standby position HP and the second detection position TP2 that is another of the four corners of the transfer region TA and diagonally opposite to the first detection position TP1. In a case where the detection jig 70 is attached to the first detection position TP1, since the first detection position TP1 is relatively close to the standby position HP, transfer of the thermal transfer foil 82 can be started immediately after detection of whether the pressing body 66 is present or not. On the other hand, in a case where the detection jig 70 is attached to the second detection position TP2, the transfer region TA can be made relatively large as compared to the case where the detection jig 70 is attached to the first detection position TP1, and thus, flexibility in placing the transfer object 80 is relatively high.

In the foil transfer apparatus 10 of this preferred embodiment, the controller 90 includes the notifier 96 that notifies that the pressing body 66 is not attached to the case body 61 if the determiner 95 determines that the pressing body 66 is not present. Accordingly, a user can recognize that the pressing body 66 is not attached to the case body 61.

In the foil transfer apparatus 10 of this preferred embodiment, the light controller 97 applies laser light from the laser oscillator 62 if the determiner 95 determines that the pressing body 66 is present, and not to apply laser light from the laser oscillator 62 if the determiner 95 determines that the pressing body 66 is not present. In this manner, in the case where the pressing body 66 is attached to the case body 61, application of light from the laser oscillator 62 is prevented.

Second Preferred Embodiment

Figure 10:
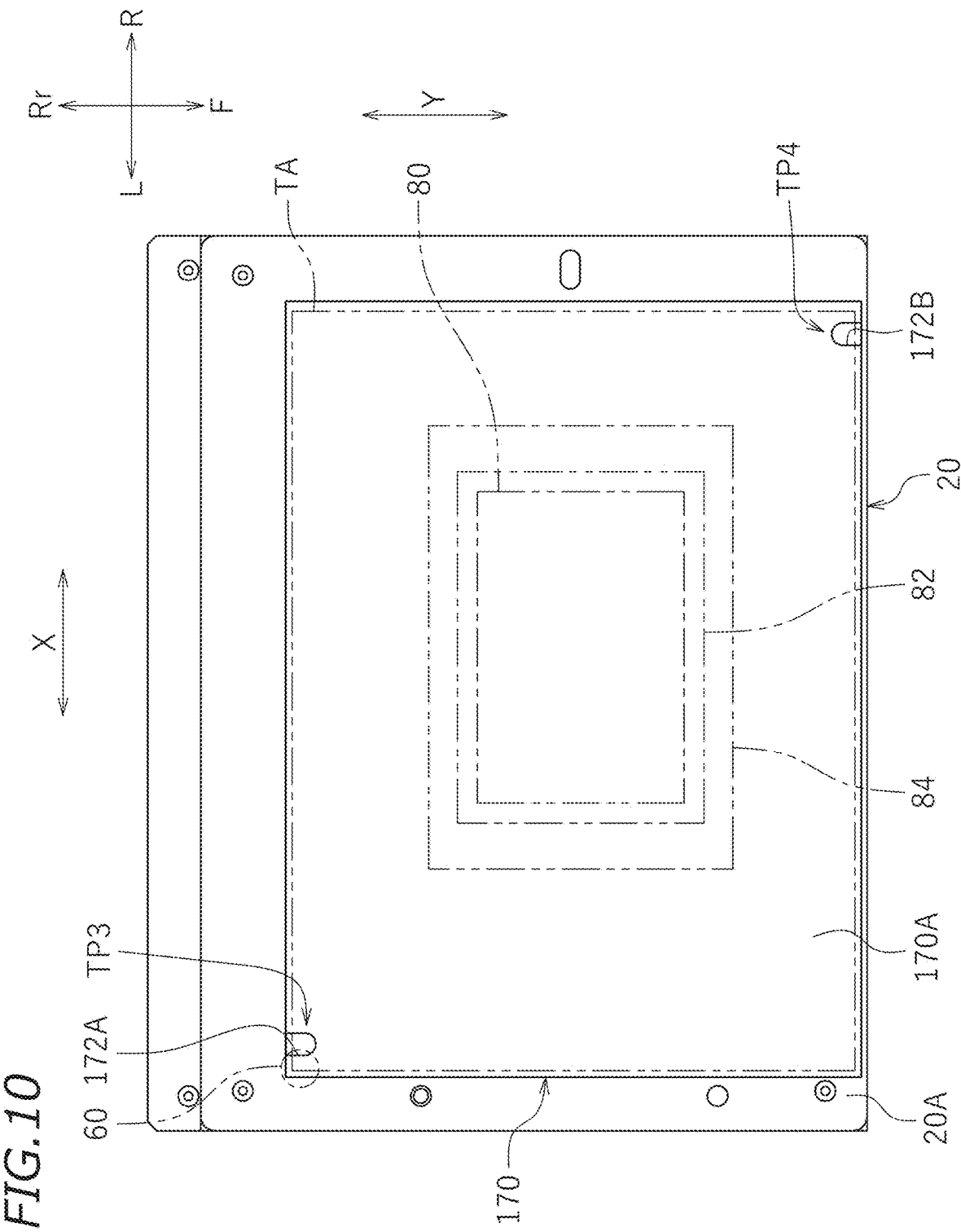
FIG. 10 is a plan view illustrating a state where an auxiliary support base as a detection jig is attached to a support base according to another preferred embodiment of the present invention.
Figure 11:
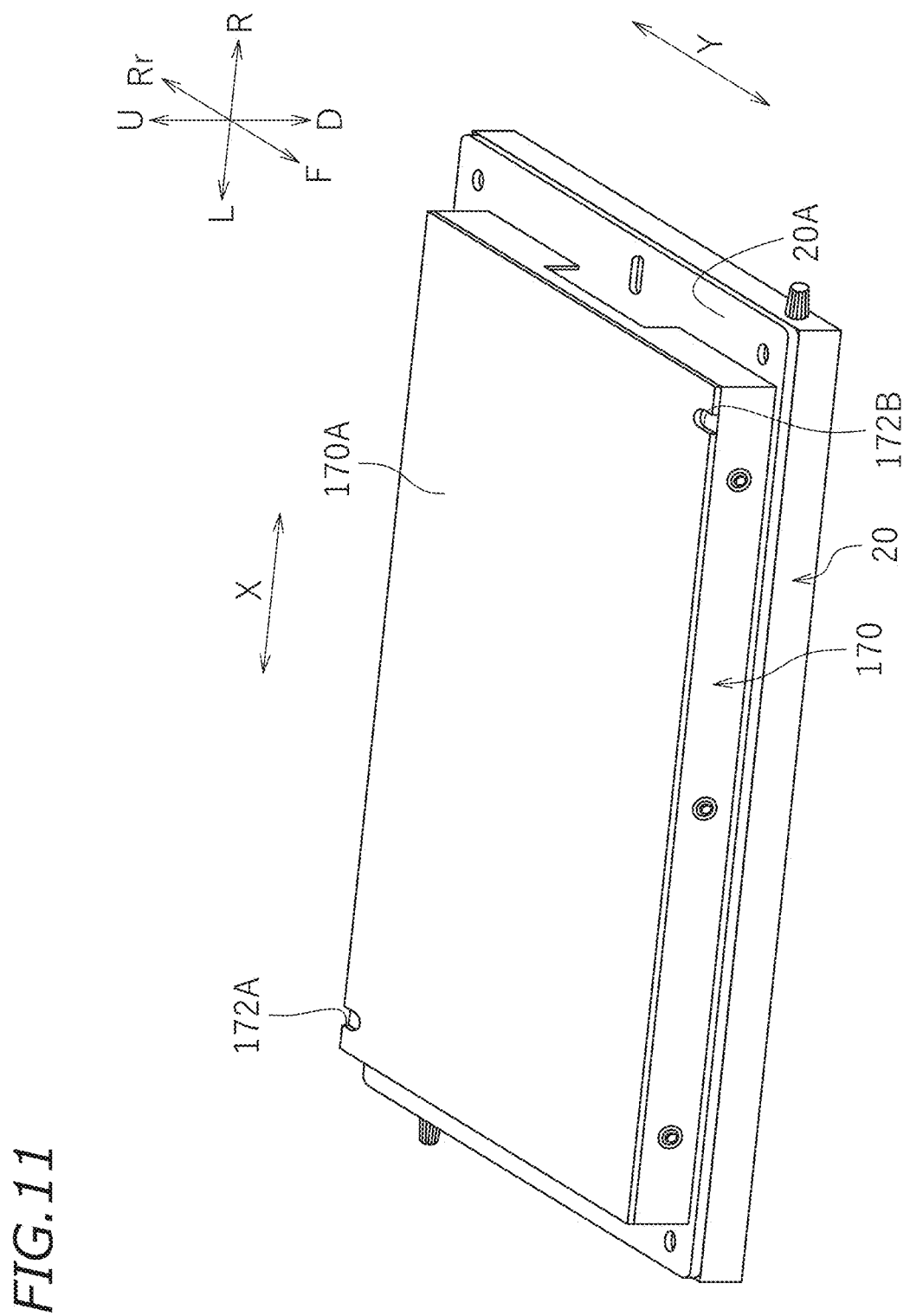
FIG. 11 is a perspective view illustrating a state where an auxiliary support base as a detection jig is attached to a support base according to another preferred embodiment of the present invention.

As illustrated in FIGS. 10 and 11, the foil transfer apparatus 10 includes an auxiliary support base 170 used to detect whether a pressing body 66 of a transfer tool 60 is present or not. The auxiliary support base 170 is an example of a detection jig. The auxiliary support base 170 is detachably attachable to a support base 20. The auxiliary support base 170 is attached to a surface 20A of the support base 20. The auxiliary support base 170 includes a mount surface 170A on which a transfer object 80 is mounted. The mount surface 170A is located above the support base 20. That is, the auxiliary support base 170 is used to move (raise) the transfer object 80 toward the transfer tool 60 in the top-bottom directions.

In the examples illustrated in FIGS. 10 and 11, a first notch 172A is located at a third detection position TP3 that is a left back corner of the four corners of the transfer region TA, and a second notch 172B is located at a fourth detection position TP4 that is a right front corner of the four corners of the transfer region TA. The first notch 172A and the second notch 172B are provided on the mount surface 170A. The first notch 172A and the second notch 172B are through holes penetrating the mount surface 170A in the top-bottom directions. The diameter of each of the first notch 172A and the second notch 172B is larger than the diameter of the pressing body 66 and smaller than the diameter of a lower surface 61B of a case body 61. The third detection position TP3 is a region that overlaps with the transfer tool 60 in plan view when the transfer tool 60 is located at a standby position HP (see FIG. 1). The third detection position TP3 is at the same position as the first detection position TP1 (see FIG. 4), for example. The fourth detection position TP4 is located diagonally opposite to the third detection position TP3. The fourth detection position TP4 is at the same position as the second detection position TP2 (see FIG. 4), for example. As illustrated in FIG. 10, the auxiliary support base 170 overlaps with a transfer region TA in plan view when the auxiliary support base 170 is attached to the support base 20.

In the example illustrated in FIGS. 10 and 11, the first notch 172A and the second notch 172B are respectively located at the third detection position TP3 and the fourth detection position TP4. However, the positions of the first notch 172A and the second notch 172B are not limited to these positions. For example, the first notch 172A and the second notch 172B may be located at the right back corner and a left front corner of the four corners of the transfer region TA. The first notch 172A and the second notch 172B may also be located on sides of the transfer region TA except for the four corners. It is sufficient to locate at least one notch on the auxiliary support base 170.

Figure 12A:
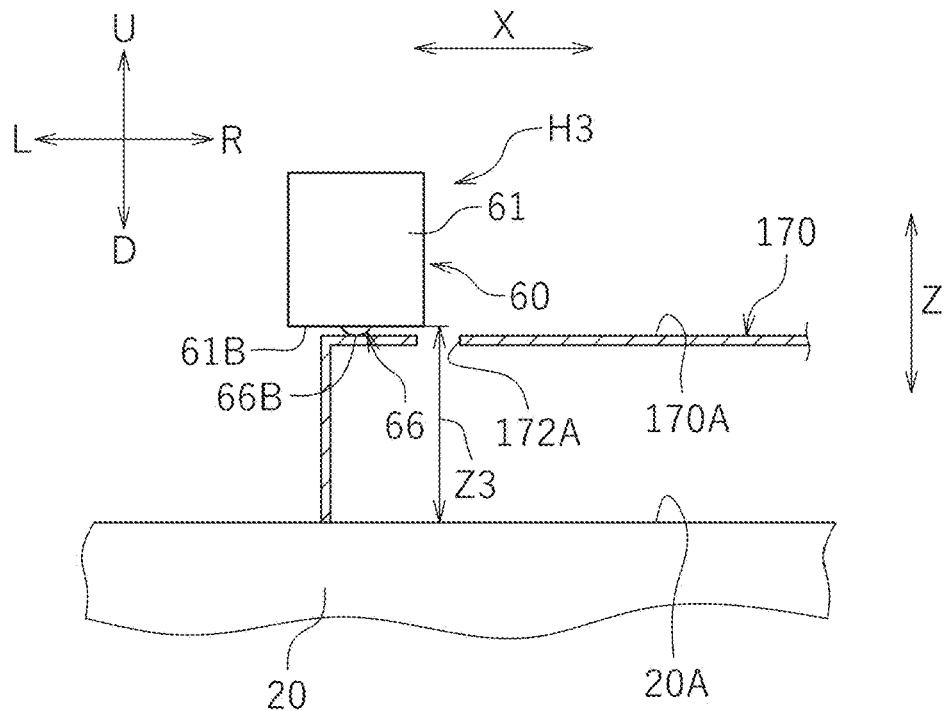
FIG. 12A is a cross-sectional view schematically illustrating a state where a pressing body of the transfer tool and the auxiliary support base are in contact with each other at a third position.
Figure 12B:
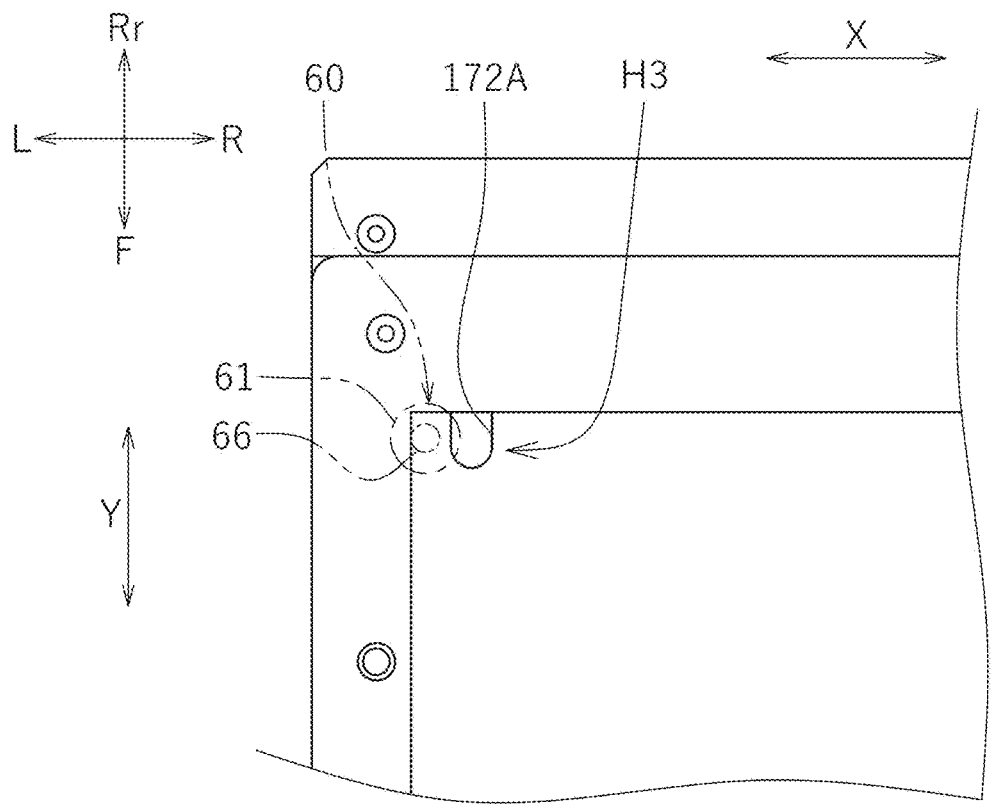
FIG. 12B is a plan view illustrating the third position.

The third detector 93 detects a third height position of the transfer tool 60 in the top-bottom directions when the transfer tool 60 is lowered and partially brought into contact with the auxiliary support base 170 at a third position H3 (see FIG. 12B) at which the pressing body 66 overlaps with the mount surface 170A of the auxiliary support base 170 in plan view. The third position H3 is at the same position as the first position H1 (see FIG. 6B), for example. As illustrated in FIG. 12A, in a case where the pressing body 66 is attached to the transfer tool 60, when the transfer tool 60 is lowered, the pressing body 66 (more specifically the lower end 66B) and the auxiliary support base 170 (more specifically the mount surface 170A) are brought into contact with each other. The third height position at this time is, for example, calculated as a length Z3 in the top-bottom directions from the surface 20A of the support base 20 to the lower surface 61B of the case body 61. The third detector 93 controls the first motor 38, the second motor 42, and the third motor 46.

Figure 13A:
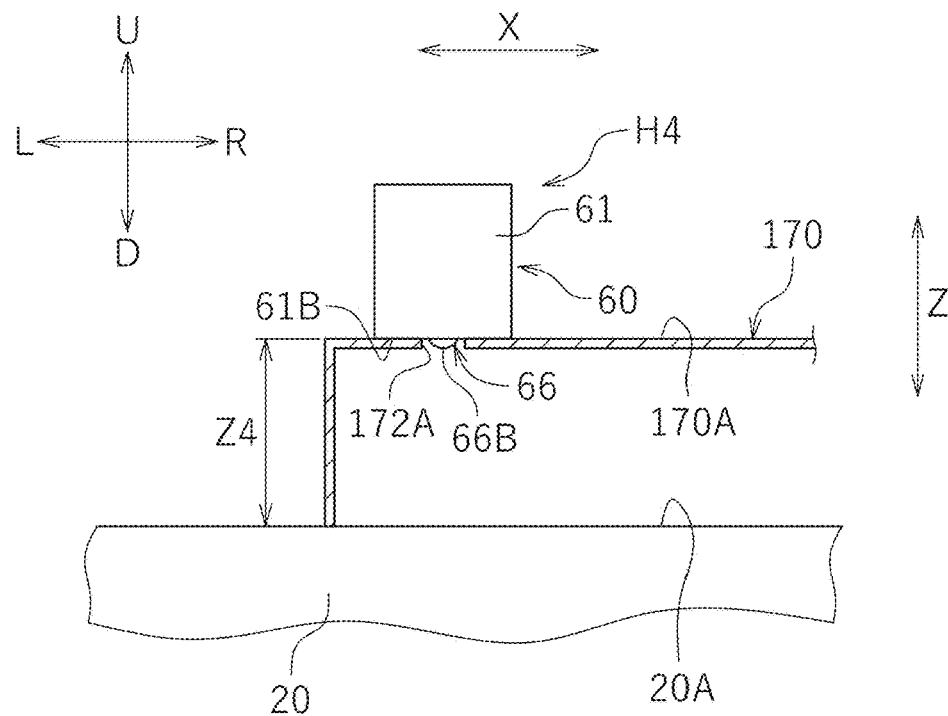
FIG. 13A is a cross-sectional view schematically illustrating a state where the case body of the transfer tool and the auxiliary support base are in contact with each other at a fourth position.
Figure 13B:
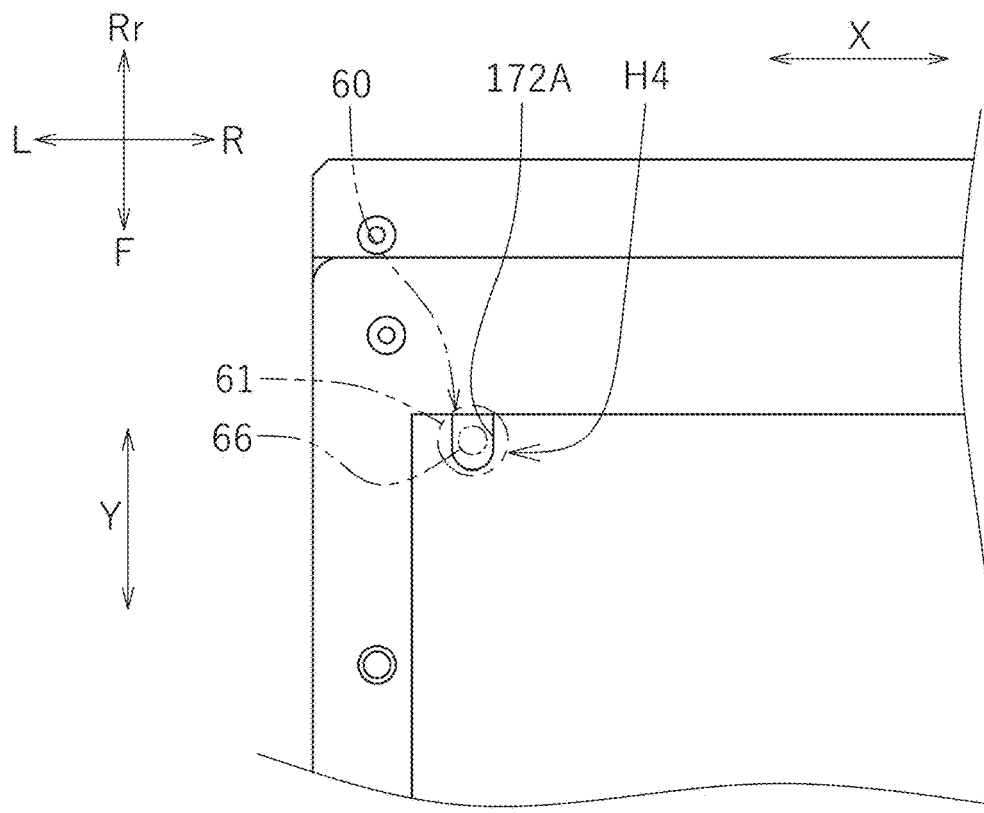
FIG. 13B is a plan view illustrating the fourth position.

The fourth detector 94 detects a fourth height position of the transfer tool 60 in the top-bottom directions when the transfer tool 60 is lowered and partially brought into contact with the auxiliary support base 170 at a fourth position H4 (see FIG. 13B) at which the pressing body 66 does not overlap with the mount surface 170A of the auxiliary support base 170 in plan view and at least a portion of the case body 61 overlaps with the mount surface 170A. The fourth position H4 is at the same position as the second position H2 (see FIG. 7B), for example. As illustrated in FIG. 13A, in a case where the pressing body 66 is attached to the transfer tool 60, when the transfer tool 60 is lowered, the case body 61 (more specifically the lower surface 61B) and the auxiliary support base 170 (more specifically the mount surface 170A) are brought into contact with each other. The fourth height position at this time is, for example, calculated as a length Z4 in the top-bottom directions from the surface 20A of the support base 20 to the lower surface 61B of the case body 61. The fourth detector 94 controls the first motor 38, the second motor 42, and the third motor 46.

Figure 14:
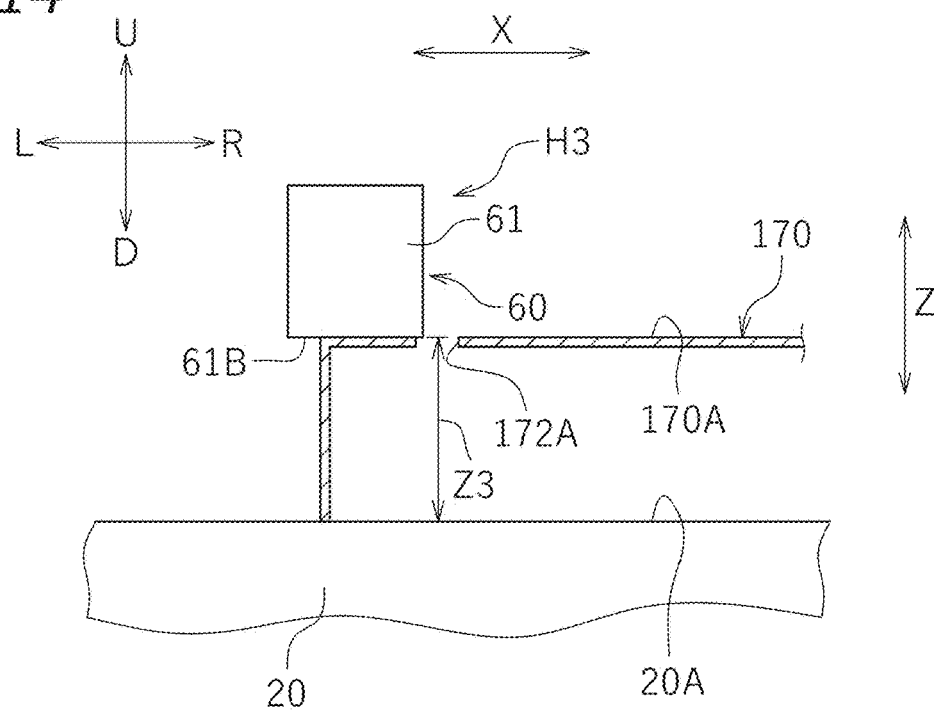
FIG. 14 is a cross-sectional view schematically illustrating a state where the case body of the transfer tool and the auxiliary support base are in contact with each other at the third position.

The determiner 95 determines whether the pressing body 66 is present or not based on the reference length LB (see FIG. 2) stored in the memory 90A, the third height position detected by the third detector 93, and the fourth height position detected by the fourth detector 94. That is, the determiner 95 determines whether or not the absolute value of a difference between the third height position and the fourth height position (e.g., |Z3−Z4|) is equal to the reference length LB. If the absolute value of the difference between the third height position and the fourth height position is equal to the reference length LB, the determiner 95 determines that the pressing body 66 is present. On the other hand, if the absolute value of the difference between the third height position and the fourth height position is not equal to the reference length LB, the determiner 95 determines that the pressing body 66 is not present. For example, as illustrated in FIG. 14, in a case where the pressing body 66 is not attached to the transfer tool 60, when the transfer tool 60 is lowered at the third position H3, the case body 61 (more specifically the lower surface 61B) and the auxiliary support base 170 (more specifically the mount surface 170A) are brought into contact with each other. That is, the third height position at this time is equal to the fourth height position, and the absolute value of the difference between the third height position and the fourth height position is not equal to the reference length LB.

In the foil transfer apparatus 10 of this preferred embodiment, the auxiliary support base 170 is used as a detection jig. The auxiliary support base 170 includes the mount surface 170A on which the transfer object 80 is placed and is located above the support base 20 when the auxiliary support base 170 is attached to the support base 20. The auxiliary support base 170 includes the first notch 172A and the second notch 172B formed in the mount surface 170A. The use of the auxiliary support base 170 enables the transfer object 80 to be moved closer to the transfer tool 60. That is, even if the transfer object 80 is a relatively thin member (i.e., has a small length in the top-bottom directions), the thermal transfer foil 82 can be transferred. In addition, since the auxiliary support base 170 has the first notch 172A and the second notch 172B, it is possible to detect whether the pressing body 66 is present or not as described above.

In the foil transfer apparatus 10 of this preferred embodiment, the first notch 172A and the second notch 172B are through holes penetrating the mount surface 170A in the top-bottom directions. As described above, since the auxiliary support base 170 has the through holes, it is possible to easily detect the presence or absence of the pressing body 66.

In the foil transfer apparatus 10 of this preferred embodiment, the notches include the first notch 172A located at the third detection position TP3 that is one of the four corners of the transfer region TA and overlaps with the transfer tool 60 in plan view when the transfer tool 60 is at a standby position HP and the second notch 172B located at the fourth detection position TP4 that is another of the four corners of the transfer region TA and diagonally opposite to the third detection position TP3. In the case of detecting whether the pressing body 66 is present or not by using the first notch 172A, since the third detection position TP3 is relatively close to the standby position HP, transfer of the thermal transfer foil 82 can be started immediately after the presence or absence of the pressing body 66 is detected. On the other hand, in the case of detecting whether the pressing body 66 is present or not by using the second notch 172B, the transfer region TA can be made relatively large as compared to the case of using the first notch 172A, and thus, flexibility in placing the transfer object 80 is relatively high.

In the preferred embodiment described above, the first notch 172A and the second notch 172B are through holes penetrating the mount surface 170A in the top-bottom directions. However, the first notch 172A and the second notch 172B are not limited to this example. The first notch 172A and the second notch 172B may be recesses that are recessed downward from the mount surface 170A. In the case where recesses are provided, the depth of the recesses is larger than the length of projection of the pressing body 66. That is, when the transfer tool 60 is lowered so that the pressing body 66 enters the recess at the fourth position H4, the pressing body 66 does not contact the recess.

The foregoing description is directed to the preferred embodiments of the present invention. The preferred embodiments described above, however, are merely examples, and the present invention can be performed in various modes.

Figure 15:
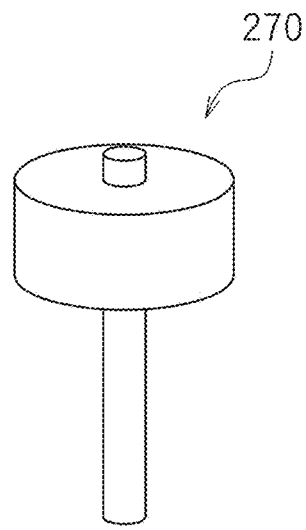
FIG. 15 is a perspective view schematically illustrating a detection jig according to another preferred embodiment of the present invention.
Figure 16:
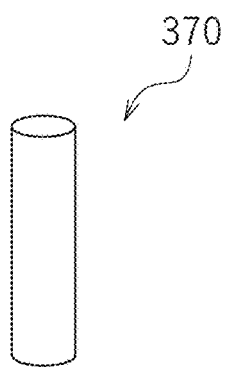
FIG. 16 is a perspective view schematically illustrating a detection jig according to another preferred embodiment of the present invention.

As illustrated in FIG. 15, as a detection jig that is detachably attachable to the support base 20, a detection jig 270 of a spinning top type may be used. As illustrated in FIG. 16, as a detection jig that is detachably attachable to the support base 20, a detection jig 370 of a cylindrical columnar type may be used.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or referred to during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A foil transfer apparatus comprising:
   a support base to receive a transfer object placed thereon;
   a transfer tool including a case body and a pressing body to press the transfer object and a thermal transfer foil placed on the transfer object and to apply light to the thermal transfer foil, the transfer tool being movable in a transfer region having a rectangular or substantially rectangular shape in plan view, the pressing body projecting downward from a lower surface of the case body;
   a moving mechanism to move the transfer tool relative to the support base;
   a detection jig that is detachably attachable to the support base to overlap with the transfer region in plan view when the detection jig is attached to the support base, the detection jig being usable to detect whether the pressing body is present or not; and
   a controller to control the transfer tool and the moving mechanism; wherein
   the controller includes:
      a memory to store a reference length that is a length in a top-bottom direction from a lower end of the pressing body to a lower surface of the case body;
      a first detector to detect a first height position of the transfer tool in the top-bottom direction when the transfer tool is lowered and partially brought into contact with the detection jig at a first position at which the pressing body overlaps with the detection jig in plan view;
      a second detector to detect a second position of the transfer tool in the top-bottom direction when the transfer tool is lowered and partially brought into contact with the detection jig at a second position at which the pressing body does not overlap with the detection jig in plan view and at least a portion of the case body overlaps with the detection jig in plan view; and
      a determiner configured to determine whether the pressing body is present or not based on the reference length, the first height position, and the second height position.

2. The foil transfer apparatus according to claim 1, wherein
   the detection jig is detachably attachable to a first detection position and a second detection position;
   the first detection position is one of four corners of the transfer region and overlaps with the transfer tool in plan view when the transfer tool is at a standby position; and
   the second detection position is another of the four corners of the transfer region and is located diagonally opposite to the first detection position.

3. The foil transfer apparatus according to claim 1, wherein
   the detection jig includes an auxiliary support base including a mount surface on which the transfer object is placed and which is located above the support base when the detection jig is attached to the support base;
   the auxiliary support base includes a notch on the mount surface; and
   the controller includes:
      a third detector to detect a third height position of the transfer tool in the top-bottom direction when the transfer tool is lowered and partially brought into contact with the auxiliary support base at a third position at which the pressing body overlaps with the mount surface in plan view; and
      a fourth detector to detect a fourth height position of the transfer tool in the top-bottom direction when the transfer tool is lowered and partially brought into contact with the auxiliary support base at a fourth position at which the pressing body overlaps with the notch in plan view and at least a portion of the case body overlaps with the mount surface in plan view; and
   the determiner is usable to determine whether the pressing body is present or not based on the reference length, the third height position, and the fourth height position.

4. The foil transfer apparatus according to claim 3, wherein the notch is a through hole penetrating the mount surface in the top-bottom direction or a recess that is recessed downward from the mount surface.

5. The foil transfer apparatus according to claim 3, wherein
   the notch includes a first notch and a second notch;
   the first notch is at a third detection position that is one of four corners of the transfer region and overlaps with the transfer tool in plan view when the transfer tool is located at a standby position; and
   the second notch is at a fourth detection position that is another of the four corners of the transfer tool and located obliquely opposite to the third detection position.

6. The foil transfer apparatus according to claim 1, wherein the controller includes a notifier to notify that the pressing body is not attached to the case body if the determiner determines that the pressing body is not present.

7. The foil transfer apparatus according to claim 1, wherein
   the transfer tool includes a light source to apply light to the thermal transfer foil through the pressing body;
   the controller includes a light controller to control application of light from the light source; and the light controller is usable to apply light from the light source if the determiner determines that the pressing body is present and not to apply light from the light source if the determiner determines that the pressing body is not present.

* * * * *